Figure 1:
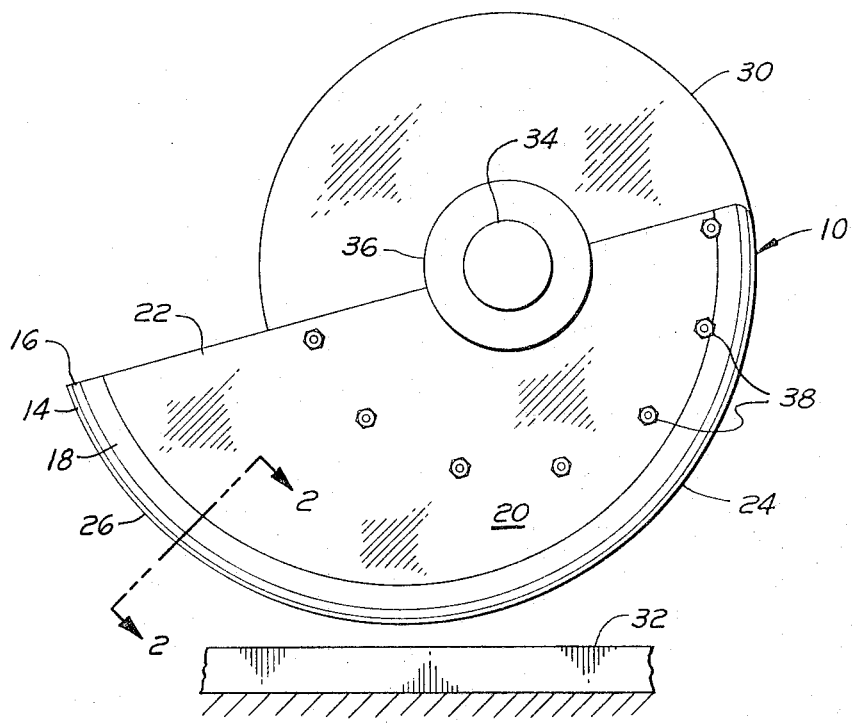

Jan. 24, 1967    W. J. McBRADY ETAL    3,299,925
BLADE DESIGN
Filed July 16, 1964

WILLIAM J. McBRADY
FRED H. DICKOW
INVENTORS.

BY
ATTORNEY.

United States Patent Office 3,299,925
Patented Jan. 24, 1967

3,299,925
BLADE DESIGN
William J. McBrady and Fred H. Dickow, Hazelcrest, Ill., assignors to Swift & Company, Chicago, Ill., a corporation of Illinois
Filed July 16, 1964, Ser. No. 383,045
9 Claims. (Cl. 146—95)

The present invention deals with an improved knife blade design; and more specifically, is directed to a novel and improved cutting edge devised for efficiently severing meat product in semi-frozen condition.

In the manufacture of sliced meat products, accuracy of slicing is extremely important. Slice size must be accurately controlled so that quantities of such product may be readily produced and assembled in merchantable units of weight, for example, half-pound and one pound groups of slices. Additionally, sliced meat products are very often displayed with a substantial portion of the sliced surface visible to the prospective consumer. As a result, the sliced surfaces must be clean and smooth and the edges thereof should not be ragged or frayed.

Many meat products are automatically assembled into groups of an appropriate weight as they are sliced. Examples are sliced luncheon meats, bacon, and sliced ground meat patties. All of these products are normally sliced at very high speed, and it is required that the slicer blade lay each slice accurately in a predictable position with respect to preceding slices. However, this is a difficult problem that may be adversely affected by both the shape of the blade and the temperature of the product. Generally speaking, available blade designs will either give a smooth cut surface and erratic "lay-down" or a ragged surface and accurate "lay-down." The temperature of the meat is also significant in obtaining a slice of accurate thickness and smooth surface, and accurate "lay-down." Fraying usually declines with temperature. Also, if meat is at a relatively high temperature, it becomes soft and pliable and may be deformed by the cutting blade, with the result that accurate thickness is hard to control. However, if the meat is frozen solid, the cutting operation requires higher power and the slices tend to chip and break. Uncooked meat products such as ground hamburger patties and bacon are, accordingly, in best condition for accurate slicing when they are in the latent heat area between unfrozen and frozen state which is often termed "semifrozen" and is generally defined by the temperature range of 25–29° F. However, at that temperature range it was found that either the "lay-down" pattern of regular knife blades was highly erratic, or the sliced surfaces were ragged and frayed.

Previously, blades have been available with either a single beveled surface or a double beveled surface. These designs have not provided adequately for both smooth cut surfaces and accurate lay-down when slicing meat in the semifrozen condition. We have found that the taper on such blades is inherently either too fine or too coarse for obtaining both desired characteristics. Lay-down of slices is extremely critical at temperatures below 29° F. However, double beveled blades which provide a coarse bevel are relatively erratic in laying slices down at all temperatures; and single beveled blades which provide a relatively fine bevel angle tend to fray and shred the severed surfaces. The present bevel design, however, obtains both desired advantages.

It is, accordingly, a principal object of the present invention to provide an improved blade design for slicing meat product in semifrozen condition.

It is another object of the present invention to provide an improved blade design that will slice cleanly through meat product in semifrozen condition and produce smooth, severed surfaces.

It is still another object of the present invention to provide an improved blade for cutting meat product in semifrozen condition that will repeatedly lay or position the severed slice accurately with respect to preceding slices.

It is still another object of the present invention to provide an improved blade for slicing meat in semifrozen condition that will both accurately position severed slices and produce slices of a smooth severed surface.

Basically, the present invention comprises a blade formed from a metal plate and having a cutting edge which is composed of three contiguous beveled surfaces each being at successively smaller acute angles to one side of the plate.

Figure 2:
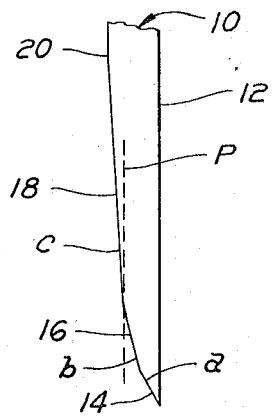

Further objects and advantages of the present invention will become apparent upon reading the following specification in conjunction with the drawings wherein:

FIGURE 1 is a front view of a preferred embodiment of the present invention mounted for slicing operation; and FIGURE 2 is a partial cross-sectional view of the blade shown in FIGURE 1.

Broadly speaking, a blade conforming to the present invention is constructed from a metal plate, generally 10, having at least one flat side 12 which is the back side, hidden from view, in FIGURE 1. The present improved cutting edge comprises three contiguous and successive beveled surfaces 14, 16 and 18 extending from the extremity of the flat side 12 to an opposite front side 20. The angle of each of the beveled surfaces 14, 16 and 18, with respect to the flat side 12, is critical and each angle decreases in magnitude in order of location from the flat side 12.

It is essential that the aforementioned angles fall within the following stated ranges. The angle between the first beveled surface 14 and the flat side 12, measured where those surfaces join, angle A in FIGURE 2, should be between about 27°–33° and is preferably 30°. The angle of the second beveled surface 16 is shown as angle B between the latter surface and an imaginary plane P parallel to the flat side 12 in FIGURE 2. Angle B should be between about 12°–18° and is preferably 15°. Finally, the angle of the third beveled surface 18, shown as angle C between the latter surface and imaginary plane P, should be between 5° and 11°, preferably 8°.

The width of each of the aforementioned beveled surfaces should also be within certain ranges. Generally speaking, the width of each successive surface increases as the bevel angle decreases. While the actual measurement will depend greatly upon the thickness of the plate 10 from which the blade is constructed, the cumulative width, normal to the blade edge, should measure between 1½–1¹⁵⁄₁₆ inches. It is preferred that the first beveled surface 14 be between ¹⁄₁₆–⅛ inch wide; the second beveled surface 16 should be between ³⁄₁₆–⁵⁄₁₆ inch wide; and the third beveled surface 18 should be between about 1–1½ inches wide.

It was observed that in operation the foregoing blade structure, when severing a slice, both smoothly severed each slice, probably because the leading surfaces 14 and 16 provided a relatively coarse bevel with respect to the flat side 12, and accurately laid each slice, probably because of the relatively wide fine bevel provided by the trailing surfaces 16 and 18. The flat side 12 of the blade was disposed against the large body of the product severed and each slice fell away therefrom accurately in the direction of the beveled surfaces.

A preferred embodiment of the improved blade of this invention for slicing extruded sticks of ground hamburger meat is shown in FIGURE 1 wherein the blade comprises a segment of a circular plate ⁵⁄₁₆ inch thick, having a straight cord edge 22 and an arcuate peripheral edge 24. A cutting edge formed of three contiguous beveled surfaces as above described is ground along a portion 26 of the peripheral edge 24. A major portion of the cutting edge 26 conforms to the following dimensions. Angle A equals 30°, angle B equals 15° and angle C equals 8°. The width of each beveled surface throughout the major portion of the cutting edge is as follows: the first beveled surface 14 is 1/8 inch wide, the second beveled surface 16 is 1/4 inch wide, and the third beveled surface 18 is 1 1/8 inch wide.

The foregoing preferred blade is designed principally for severing ground meat patties from extruded sticks of ground meat in a horizontal feed machine. The blade plate generally 10 is secured to a rotary member 30, such as a fly wheel, of the slicing machine above and adjacent an anvil 32 whereon the product is placed. The preferred blade, being a segment of a circle, is offset with respect to a shaft 34 of the rotary member 30 so that the cutting edge 26 will be at the greatest distance from the shaft 34 and will swing across the anvil 32 and product thereon. The plate generally 10 may be secured to the rotary member 30 by a hub 36 and a plurality of bolts 38.

Obviously many modifications and variations of the invention as hereinbefore set forth may be made without departing from the spirit and scope thereof, and therefore only such limitations should be imposed as are indicated in the appended claims.

We claim:

1. An improved blade for slicing meat in semifrozen condition at about 25–29° F., said blade comprising: a metal plate member having a flat side; and a cutting edge thereon formed of three contiguous beveled surfaces, each of said beveled surfaces being at successively smaller acute angles to said flat side and planes parallel to said side, respectively, in order of succession from said flat side.

2. An improved blade according to claim 1 wherein the total cumulative width of said three surfaces, measured perpendicular to said edge, is between about 1 1/4 inch and 1 15/16 inch.

3. An improved blade according to claim 1 wherein the successive angles are within the ranges of about 27°–33°, 12°–18°, and 5°–11°, respectively, in order of succession from said flat side.

4. An improved blade according to claim 2 wherein the successive angles are within the ranges of about 27°–33°, 12°–18°, and 5°–11°, respectively, in order of succession from said flat side.

5. An improved blade according to claim 1 wherein said cutting edge is arcuate.

6. An improved blade according to claim 1 wherein said plate member is a segment of a circle and said cutting edge is formed along a portion of the arcuate periphery of said segment.

7. An improved blade according to claim 2 wherein said plate member is a segment of a circle and said cutting edge is formed along a portion of the arcuate periphery of said segment; and said cumulative width is measured perpendicular to a major portion of said edge.

8. An improved blade according to claim 4 wherein said plate member is a segment of a circle and said cutting edge is formed along a portion of the arcuate periphery of said segment; and said cumulative width is measured perpendicular to a major portion of said edge.

9. An improved blade for slicing meat in semifrozen condition at about 25°–29° F., said blade comprising: a metal plate in the form of a segment of a circle and having a flat side; means to mount said plate on a rotating member of a slicing machine with the arcuate periphery thereof disposed off center in a plane of rotation of said rotating member; and a cutting edge formed along a portion of said arcuate periphery more distant from a center of rotation, said cutting edge being formed of first, second, and third contiguous surfaces beveled at angles to said flat side, said first surface being about 1/8 inch wide and beveled at an angle of about 30° to said flat side, said second surface extending from the first surface and being about 1/4 inch wide and beveled at an angle of about 15° to a plane parallel to said side, and said third surface extending between said second surface and a side opposite said flat side for a width of about 1 1/8 inch and beveled at an angle of about 8° to a plane parallel to said flat side.

References Cited by the Examiner

UNITED STATES PATENTS

| | | | |
|---|---|---|---|
| 1,957,623 | 5/1934 | Walter | 146—94 |
| 2,244,053 | 6/1941 | Comstock | 76—104 X |
| 2,472,876 | 6/1949 | Ahrndt | 146—106 |

WILLIAM W. DYER, Jr., *Primary Examiner.*

J. W. MEISTER, *Assistant Examiner.*